| (12) | United States Patent<br>Li et al. | (10) Patent No.: US 10,872,230 B2<br>(45) Date of Patent: Dec. 22, 2020 |
|---|---|---|

(54) LOW-COST FACE RECOGNITION USING GAUSSIAN RECEPTIVE FIELD FEATURES

(71) Applicant: Intel Corporation, Santa Clara, CA (US)

(72) Inventors: Jianguo Li, Beijing (CN); Yurong Chen, Beijing (CN); Ke Chen, Cupertino, CA (US); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/562,133

(22) PCT Filed: Mar. 27, 2015

(86) PCT No.: PCT/CN2015/075190
§ 371 (c)(1),
(2) Date: Sep. 27, 2017

(87) PCT Pub. No.: WO2016/154781
PCT Pub. Date: Oct. 6, 2016

(65) Prior Publication Data
US 2018/0082107 A1 Mar. 22, 2018

(51) Int. Cl.
*G06K 9/00* (2006.01)
*G06K 9/46* (2006.01)
*G06K 9/62* (2006.01)

(52) U.S. Cl.
CPC ..... *G06K 9/00281* (2013.01); *G06K 9/00288* (2013.01); *G06K 9/4619* (2013.01); *G06K 9/623* (2013.01); *G06K 9/6228* (2013.01)

(58) Field of Classification Search
None
See application file for complete search history.

(56) References Cited

U.S. PATENT DOCUMENTS

| 8,948,500 | B2* | 2/2015 | Chen | G06K 9/6219<br>382/155 |
|---|---|---|---|---|
| 2010/0135582 | A1* | 6/2010 | Gokturk | G06F 17/30259<br>382/195 |

(Continued)

FOREIGN PATENT DOCUMENTS

| CN | 101419671 A | 4/2009 |
|---|---|---|
| CN | 102096823 A | 6/2011 |
| CN | 103345624 A | 10/2013 |

OTHER PUBLICATIONS

Large Scale Supervised Hierarchical Feature Learning for Face Recognition. Li et al. Jul. 2014.*

(Continued)

*Primary Examiner* — Delomia L Gilliard
(74) *Attorney, Agent, or Firm* — Jordan IP Law, LLC

(57) ABSTRACT

Methods and systems may provide for facial recognition of at least one input image utilizing hierarchical feature learning and pair-wise classification. Receptive field theory may be used on the input image to generate a pre-processed multi-channel image. Channels in the pre-processed image may be activated based on the amount of feature rich details within the channels. Similarly, local patches may be activated based on the discriminant features within the local patches. Features may be extracted from the local patches and the most discriminant features may be selected in order to perform feature matching on pair sets. The system may utilize patch feature pooling, pair-wise matching, and large-scale training in order to quickly and accurately perform facial recognition at a low cost for both system memory and computation.

25 Claims, 9 Drawing Sheets

(56) References Cited

U.S. PATENT DOCUMENTS

2012/0087552 A1\* 4/2012 Lee .................. G06K 9/00275
                                                                         382/118
2015/0278642 A1\* 10/2015 Chertok .................. G06N 3/02
                                                                         382/156

OTHER PUBLICATIONS

International Search Report and Written Opinion for International Patent Application No. PCT/CN2015/075190, dated Jan. 4, 2016, 9 pages.
European Search Report for European Application No. 15886768.9, dated Oct. 23, 2018, 5 pages.
Li, Jianguo et al., "Large-scale Supervised Heirarchical Feature Learning for Face Recognition", Jul. 6, 2014, URL: <https://arxiv.org/pdf/1407,1490 .pdf>, 8 pages.

\* cited by examiner

LOW-COST FACE RECOGNITION USING GAUSSIAN RECEPTIVE FIELD FEATURES

CROSS REFERENCE TO RELATED APPLICATIONS

This Application is a U.S. National Phase patent application which claims benefit to International Patent Application No. PCT/CN2015/075190 filed on Mar. 27, 2015.

BACKGROUND

Face recognition (FR) has recently received a great deal of attention due to the wide range of applications in which it can be implemented including information security, law enforcement, surveillance and general image understanding. With the evolution of handheld digital devices and social networking, face recognition entered a new era and encounters new challenges. Known FR systems may involve complex processes that require very large computation and memory capabilities that lead to significant costs, whereas handheld devices commonly have limited computing power and memory resources. These factors may have therefore made FR systems impractical for smaller devices (e.g., handheld and mobile devices). Further, mobile images and social network images may most often be taken under uncontrolled imaging conditions. In fact, these uncontrolled imaging conditions may result in virtually unlimited variability due to the billions of face images available today. Simply put, conventional FR systems may not be useful for smaller, handheld and/or mobile devices, due to inaccurate computations, high cost, large memory footprints and high computation overhead.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
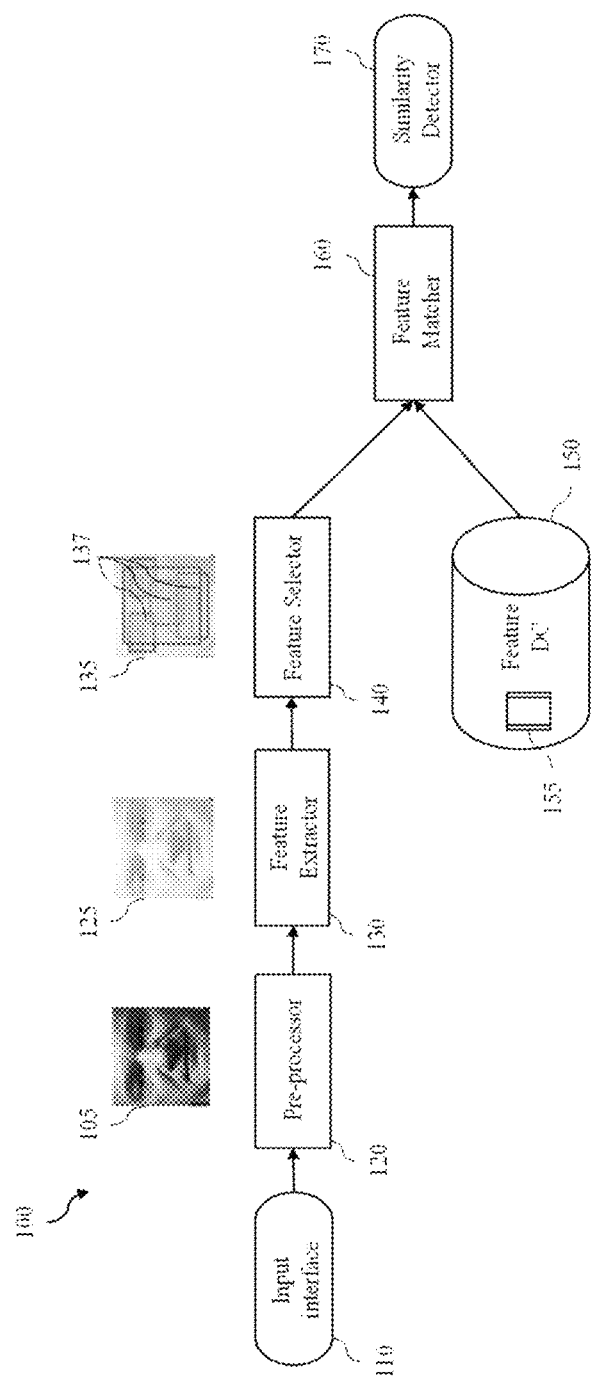
FIG. 1 is an illustration of an example of an overview of a face recognition framework according to an embodiment.

FIG. 1 shows an overview of a facial recognition (FR) system 100 that utilizes both hierarchical feature learning and large-scale classification engine training. The system 100 may include an image input interface 110, a de-illuminator/pre-processor 120, a feature extractor 130, a feature selector 140, a feature database 150, a large-scale classification engine 155, a feature matcher 160, and a similarity detector 170. The illustrated system 100 enables the use of over-complete face features of an input image 105 (i.e., of a face) in order to quickly and accurately perform facial recognition on the image 105. The system 100 may provide a low-cost (both memory and computation) image classification model while preserving high accuracy (e.g., over 94%). In order to realize low-cost memory, the illustrated system 100 adopts simple over-complete subset theory features. In order to realize low-cost memory, the illustrated system 100 trains a classifier on (sufficiently diversified) large-scale datasets on computing clusters to achieve good classification generalization capability. The large-scale datasets may include, for example, "big data" or data having sets that are too large and/or complex to make practical use with traditional data processing applications due to, for example, issues related to the capture, analysis, storage, sharing, dissemination/sharing, etc. of the data.

Additionally, the system 100 may utilize hierarchical feature learning and learning classification to: extract low-level features using Gaussian Receptive Fields (GRF) from over-complete patches in normalized face images; build pair-wise feature representation for face images and map the face recognition problem to a binary classification problem in order to determine whether a pair of faces is coming from the same subject; and, provide a linear classifier (e.g., via a support vector machine (SVM)) that performs image classification having good classification generalization capability utilizing an image classification model that is trained on large-scale datasets on clusters with alternating direction method of multipliers (ADMM) algorithm framework. The learning classification may utilize an engine to perform pairwise classification that can be optimized to quickly achieve a facial recognition decision. In at least some embodiments, the system 100 may be embodied to include, but are not limited to, notebook computers, smart tablets, personal digital assistants (PDAs), mobile Internet devices (MIDs), wireless smart phones, image capture devices, media players, etc., wherein the illustrated system 100 may enable fast and reliable facial recognition applications including, for example, security authentication (e.g., computer login, checkpoint validation, etc.), system authentication (e.g., door or gate access control), surveillance (e.g., observation of crowds and high security locations such as subways, airports, shopping malls, supermarkets, stadiums, etc.).

As will be discussed in greater detail, the system 100 may receive an input image 105 at input interface 110 from an image source (not shown), e.g., a camera, database, or the like. The illustrated de-illumination/pre-processor 120 utilizes receptive field theory to model and process the input image 105 to yield a pre-processed image 125. The pre-processed image 125 may be represented by a multi-channel image (see, for example, multi-channel receptive field image 210 below), and following receptive field theory, each channel may be represented as a Gaussian receptive response map at certain parameters. The de-illumination/pre-processor 120 may also activate one or more channels of the pre-processed image 125 (e.g., the multi-channel image 210) to yield activated channel(s) 135, e.g., activated channels 220. The pre-processor 120 may also identify multiple feature-rich, local patches 137 within each activated channel 135. As some channels in the multi-channel image 135 (see, e.g., the multi-channel image 210) are more discriminant than others (e.g., they have a stronger ability to differentiate features), only the top, e.g., top-P, most discriminant channels are activated for face recognition (e.g., via a floating search method). The pre-processor 120 may also activate one or more local patches 137 in order to quickly and accurately identify facial features. The feature extractor 130 may identify the top, e.g., top-Q, most discriminant local patches, e.g., local patches 137. In order to identify the top local patches, the feature extractor 130 may define one or more multi-channel images 135 by a series of over-completed local patches 137. The local patches 137 may each focus on different identity rich facial features, e.g., the structural and spatial features of the eyes, nose, mouth, etc. Since the different local patches 137 typically have different discriminant power, the extractor 130 may identify and activate the top local patches 137 based on the discriminant power of each local patch 137. The feature selector 140 may utilize the activated local patches 137 to pool over certain spatial and structural features to obtain feature vectors via a machine learning application, e.g., a linear support vector machine (SVM), to yield a feature descriptor of each local patch 137. The feature matcher 160 may project the feature descriptor of each local patch 137 (received from feature selector 140) to lower dimensional subspace with discriminant subspace analysis and concatenate the learned features of different local patches 137 to obtain a full representation of the input image (i.e., input face) 105. The similarity detector 170 may compare the local patches 137 (and associated learned features) to determine if the pair set meets a pre-determined similarity threshold requirement (i.e., whether the pair sets belong to the same individual or face). The local patches 137 and their corresponding learned features may also be stored to a feature database 150. The feature database 150 may also include a large-scale classification engine 155 having a training algorithm in order to train the classification engine on pair sets $\{(x,y)\}$. The system 100 may be trained based on N training face samples, and all the features for all the N training face sample may be extracted and stored to feature database 150 in order to help enable the systems and methods disclosed herein.

Figure 2:
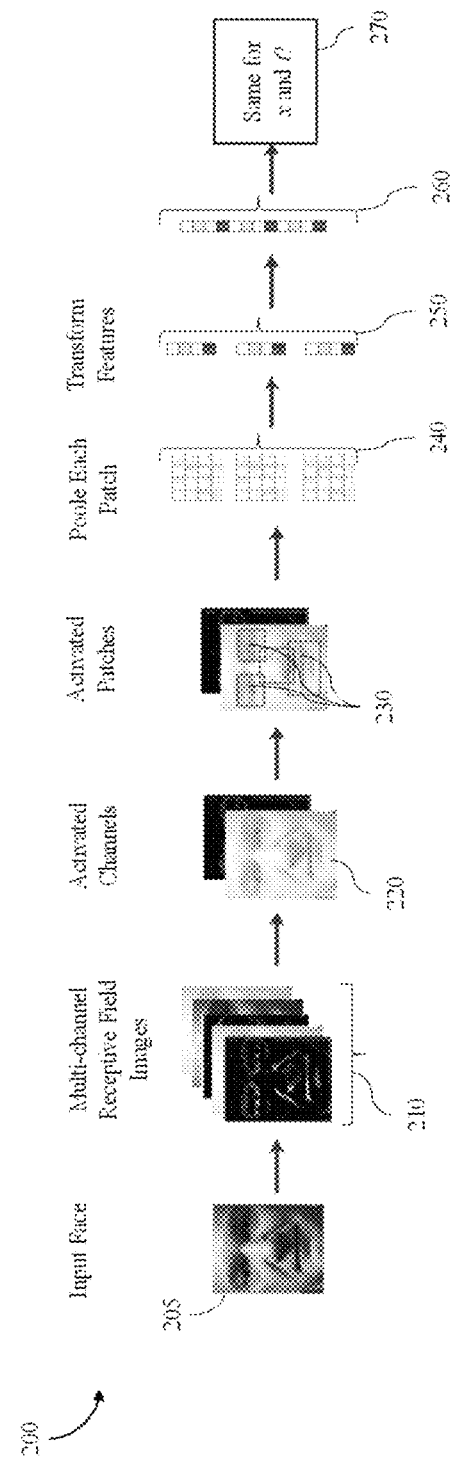
FIG. 2 is an illustration of an example of a flowchart of feature learning for face recognition according to an embodiment.

FIG. 2 illustrates a facial recognition process 200 in accordance with the present disclosure. The process 200 may extract and analyze a set over-complete facial features in an image via hierarchical feature learning methods, and utilize pair-wise classification methods to quickly and accurately perform facial recognition of the image. As discussed above with respect to the system 100, the process 200 receives an input face in an image 205. The process 200 may consist of several phases in order to perform over-complete facial analysis and recognition including multi-channel image generation 210, channel activation 220, patch activation/selection 230, patch feature pooling 240, pair-wise matching 250, large-scale training 260, and classification determination 270.

The face of the input image 205 may be modeled using receptive field theory, e.g., Gaussian Receptive Fields (GRF), which is identified as the region of the visual cortex where light alters its firing. Receptive fields in the visual cortex may be well-modeled using Gaussian derivative operators up to the $4^{th}$ order. The Gaussian derivatives of images may be referred to as the Gaussian Receptive Field (GRF) maps. The Gaussian derivatives and GRF may be defined by the equations listed below, where G(x,y) indicates a Gaussian kernel, I(x,y) indicates an input image, $0<m+n\leq4$ are the derivative orders, and L(x,y) are the response maps or channels. The Gaussian function may be defined, as follows:

$$G^{\sigma}(x,y)=\exp\{-(x^2+y^2)/2\sigma^2\}. \quad (1)$$

Given the Gaussian function, the Gaussian derivatives may be defined, as follows:

$$G^{\sigma}_{m,n}(x, y) = \frac{\partial^{m+n}}{\partial x^m \partial y^n} G^{\sigma}(x, y). \quad (2)$$

The Gaussian receptive map of image I may be defined, as follows:

$$L_{m,n}^{\sigma}(x,y)=G^{\sigma}_{m,n}(x,y)\otimes I(x,y). \quad (3)$$

where $\otimes$ denotes convolution operation, and m and n represent the derivative order for horizontal and vertical directions, respectively. Further, the computing order of the convolution and derivative operations can be exchanged and represented as follows:

$$L^{\sigma}_{m,n}(x, y) = \frac{\partial^{m+n}}{\partial x^m \partial y^n}(G^{\sigma}(x, y) \otimes I(x, y)). \quad (4)$$

Each $L^{\sigma}_{m,n}$ may be viewed as one channel of a Gaussian Receptive Field (GRF) image $I_{GFR}=\{L^{\sigma}_{m,n}\}$. When there are four (4) or fewer derivative orders (i.e., $0<m+n\leq4$), there may be fourteen (14) different combinations of m and n. In this example, when defining the smooth kernel size $\{0, 3, 5, 7\}$ (here 0 means no smooth), the four (4) derivative orders and fourteen (14) different combinations of m and n would yield a total of 56 channels (i.e., 56=14×4). Further, allowing for two (2) additional gradients (i.e., diagonal and anti-diagonal), the total number of channels would be 112 (i.e., 112=56×2). Each response map is referred to as a channel. Because all channels are not of equal importance in performing facial recognition (based on recognition accuracy tests), it is helpful to activate only the most discriminant channels.

In order to determine and active only the most discriminant channels, a series of multi-channel images 210 are generated based on GRF principles. In order to determine the more discriminant channels of the multi-channel images 210, the descriptive features of each channel are defined. The features may be obtained, for example, by pooling over 4×4 spatial grids. Each cell may be represented by two (2) values based on a transform, e.g., T2 transform, as follows:

$$\Sigma(|L^{\sigma}_{m,n}|+L^{\sigma}_{m,n}) \quad (5)$$

and $$\Sigma(|L^{\sigma}_{m,n}|-L^{\sigma}_{m,n}). \quad (6)$$

The transform yields a feature vector having 32 dimension. Spatial pooling may be utilized on each grid by sub-dividing the grid into 4×4 sub-cells. The two-layered pooling may yield a feature vector of 544 dimensions (i.e., 544=32×(1+16)). $f^{\sigma}_{m,n}$ may be denoted as the 544-dimensional meta feature of the receptive map $L^{\sigma}_{m,n}$. However, there may be a total of 112 such meta features (i.e., one per channel). Channel activation 220 may be performed via adopting an algorithm, e.g., a sequential forward floating search (SFFS) algorithm, on the meta features $\{f^{\sigma}_{m,n}\}$. The optimization objective may be true-positive-rate (TPR) at false-positive-rate (FPR) equals 0.1% (i.e., TRP @

FPR=0.1%) with nearest neighbor classification. An example of a suitable algorithm for performing the SFFS for channel (and patch) activation is provided, as follows:

Input: channel-set/patch-set with corresponding feature set F={$f^\sigma_{m,n}$}. $J(F_k)$ to measure nearest neighbor classification accuracy based on feature $F_k$.

Initialize: $F_0=\emptyset$, k=0.

Step 1: inclusion
  Find best feature $f^+$=arg max $f\in F\backslash F_k$ $J(F_k \cup f)$, where F\Fk means that F excludes the subset Fk;
  $F_{k+1}=F_k \cup f^+$; k=k+1;

Step 2: conditional exclusion
  Find worst feature $f^-$=arg max $f\in F\backslash F_k$ $J(F_k-f)$;
  if $J(F_k-f^-)>J(F_{k-1})$
    $F_{k-1}=F_k-f^-$; k=k−1;
    go to Step 2;
  else
    go to Step 1;

Output: channel/patch-subset corresponding to $F_k$.

As with L(x,y) discussed above, there may also be over-complete patches according to face landmarks (e.g., eyes, eyebrows, nose, mouth including mouth corners, etc.). Patch activation/selection 230 may be performed by refining the location of the receptive fields. This refinement may be accomplished by defining over-complete patches of each of the activated channels 220 by utilizing an algorithm for performing a SFFS for the patches, as discussed above with respect to channel activation. Assuming, for example, that there are eight (8) channels and each patch includes four-by-four (4×4) blocks. Each block may be pooled to determine a statistical average or deviation. Therefore, the feature dimension for each patch would be 128 (i.e., 128=8×4×4). A sliding window may be defined over the image (e.g., a 128×128 face image) and corresponding selected receptive maps, and the sliding window may be allowed to slide forward four (4) pixels. The sliding window may be defined as 1:1, 1:2, 1:3, 1:4, 2:1, 3:1, 4:1, 2:3, 3:2 in aspect ratio. A 4×4 spatial pooling may also be adopted for each patch, and restricted such that each cell contains at least 30 pixels. This definition would yield approximately 10,000 patches. The outlined process 200 provides a two-stage activation of channels 220 and patches 230 that provides many benefits and advantages including high accuracy and reduced computing costs. The two-stage activation, for example, is biologically based as the human brain uses a hierarchical approach to object recognition from a simple layer to a complex layer. The two-stage activation also allows straightforward computing. Since each patch 230 may be represented by spatial pooling features over multi-channels, the feature dimension may be defined as 32×P, where P is the number of active channels (e.g., 32=4×4×2, or 4×4 spatial cells×2 due to T2 transform). Having this patch descriptor, the same scheme (algorithm) may be followed as with that of channel activation, discussed above, in order to determine the most discriminant patches from the group of activated patches 230.

In order to prepare the activated patches 230 for determination of the most discriminant patches, a statistical analysis or pooling technique may be performed to yield pooled patches 240. Pooling is generally defined as an accumulation of statistics for a set of samples (in this case "pixels"). Various different statistical techniques may be used to perform the pooling including maximum pooling (max-pooling), average pooling (μ-pooling), variance pooling (σ-pooling), moment pooling (m-pooling), and the like.

Max-pooling may be used to compute the maximum value in each cell $C_i$ of a patch and may be defined by:

$$(\max_{(x,y)\in C_i}) L^\sigma_{m,n}(x,y). \quad (7)$$

Average pooling may be used to compute the average value in each cell of a patch and may be defined by:

$$\mu=E[L^\sigma_{m,n}(x,y)], \quad (8)$$

where E[x] is the expectation of variable x.

Variance pooling may be used to compute the variance value in each cell of a patch and may be defined by:

$$\sigma=E[L^\sigma_{m,n}(x,y)-\mu)^2]. \quad (9)$$

Moment pooling may be used to compute the image moment value in each cell of a patch and may be defined by:

$$\Sigma_{(x,y)\in Ci}(x-x_c)^p(y-y_c)^q L^\sigma_{m,n}(x,y), \quad (10)$$

where ($x_c$, $y_c$) is the center of the cell, p and q are the order over x and y. It may be assumed that p=1 and q=1, for convenience.

While average pooling may provide the best results (at least in some instances), any of the foregoing may be suitable for determining the most discriminant patches. However, the feature descriptor for each patch should be normalized regardless of which pooling technique is selected. A suitable normalization would be a SIFT-like normalization (e.g., $L_2$ normalization followed by clipping and renormalization).

Once the most discriminant of the activated channels 220 and most discriminant of the activated patches 230 have been determined, the activated patches 230 may be pooled together in a series of pooled patches 240 utilizing the pooling techniques discussed above in order to determine the discriminant capability within each patch. In order to make this determination, a linear discriminant analysis (LDA) may be adapted to perform a patch-level subspace analysis via a pair-wise matching function. The features of the pooled patches 240 may also be transformed on a long feature vector of transformed features 250. A pair-wise intra-subject covariance matrix $S_w$ and extra-subject covariance matrix $S_b$ may be defined, respectively, as follows:

$$S_w=\Sigma_{y_{ij}=1}(v_i-v_j)(v_i-v_j)^T \quad (11)$$

and $$S_b=\Sigma_{y_{ij}=1}(v_i-v_j)(v_i-v_j)^T, \quad (12)$$

where when $y_{ij}=1$ indicates that that vi and vj come from the same subject, otherwise $y_{ij}=-1$.

The optimization objective may be defined, as follows:

$$J(w)=w^T S_b w / w^T S_w w. \quad (13)$$

There may be many suitable ways to solve optimization including, for example, the Fisher method and maximum margin projection methods. Further, the utilization of LDA may provide the projection matrix $P\in R^{d\times p}$, which may project the d-dimensional patch descriptor into p-dimensional discriminant sub-space. The projected dimension p may be determined by the eigenvalue energy. For example, the system may retain the first p-dimension in which the corresponding eigenvalues of LDA maintain 99% of total energy. The projection matrix may be learned from training sets for each patch, where different patches may have different projected p-dimensions. Learned patch descriptors from different patches may be concatenated to obtain feature functions 260 that include a full representation of input faces sufficient to accurately match input images 205 in a manner consistent with the disclosure herein. The input images that meet a pre-defined similarity threshold may be output at classification determination 270.

Suppose, for example, that $x_i$ and $x_j$ are two face feature vectors. A pair-wise formulation, e.g., $z=g(x_i, x_j)$, may be utilized to perform pair matching such that $z$ would be positive when both $x_i$ and $x_j$ are from the same subject (i.e., image or face), otherwise $z$ would be negative. In this example, $g(,)$ is a vector function which may be element-wise absolution difference. Suppose feature vector $x=(x_1, \ldots, x_d)$, the element-wise absolution difference may be defined, as follows:

$$z=(|x_{i1}-x_{j1}|, \ldots, |x_{id}-x_{id}|) \tag{14}$$

A matching kernel may thereby be determined by the following formula, as follows:

$$F(x,t)=<w,g(x,t)>, \tag{15}$$

where w indicates matching weight.

As discussed herein, the systems and methods of the present disclosure provide low-cost classification for both memory and computation while preserving high accuracy. With respect to computation, there exists approximately four major aspects that affect the computing complexity of feature extraction. These factors include the computing complexities of: the GRF maps, the feature pooling, the patch feature projection, and the feature normalization.

The computing complexity of the GRF maps may be defined, as follows:

$$O(P \cdot w \cdot h), \tag{16}$$

where P indicates the number of activated channels, and w and h indicate the size of the normalized face images.

The computing complexity of the feature pooling is defined, as follows:

$$O(P \cdot Q \cdot w \cdot h), \tag{17}$$

where Q indicates the number of activated patches. Further, integral imaging techniques may be utilized to avoid redundant computing among different patches.

The computing complexity of the patch feature projection may be defined, as follows:

$$O(Q \cdot d \cdot p), \tag{18}$$

where d and p indicate the original dimension and projected of the patch descriptor, respectively.

The computing complexity of the feature normalization may be defined, as follows:

$$O(Q \cdot d). \tag{19}$$

As an example, for a 128×128 face image, if it is assumed that P=4, Q=240, d=128, and p=100, the resulting overall feature extraction procedure would require approximately 5 MFlops computing performance. Unlike other solutions, the disclosed system and method significantly reduces the level of required computing performance and is affordable for implementation in small embedded devices, e.g., mobile phones, smart phones, smart tablets, and the like. Further, the patch project matrix would cost Q·d·p memory when quantization is enabled, and is estimated to be approximately 3 MB when Q=240. Further still, the size of the linear SVM model is negligible in comparison to this size. As a result of these features and characteristics, the overall memory footprint of the disclosed system and method is quite small.

As already discussed, the system 100 utilizes the hierarchical feature learning framework to provide accurate facial recognition while substantially reducing resource requirements (e.g., computational complexity, memory and computing cost) and being capable of fitting into embedded devices. Other known solutions are capable of providing high accuracy for facial recognition including, for example, subspace based approaches, metric learning based approaches, kernel machine based approaches, convolutional neural network (CNN) based approaches, and the like. However, unlike the system of the present disclosure, the other known solutions require substantial memory and computing resources that make them impractical for use in mobile and handheld devices that have limited system resources. TABLE 1 listed below details the resource requirements for the system of the present disclosure compared to similar solutions. Complexity (i.e., computational complexity) is listed to indicate a function of the computational complexity. Memory footprint indicates the size of the required memory in bytes. Computing cost indicates the measure of required computing performance in Flops or Floating-point Operations Per Second. The examples listed in TABLE 1 assumes the training set size is N, the original feature dimension is d, and the projection dimension is p.

TABLE 1

| Solution Type | Computational Complexity | Memory footprint (d = 40960, p = 2000, N = 10000) | Computing Cost Required |
|---|---|---|---|
| Subspace | O(dxp) | 310 MB | 156 MFlops |
| Metric learning | O(dxp)~O(d^2) | 310 MB~6.3 GB | 156 M~3.1 GFlops |
| Kernel machine | O(N^2) | 380 MB | 200 MFlops |
| CNN | Dependent on filter kernel size | >100 MB | >10^8 ops (or >100 MFlops) |
| Present system | O(d0^2), (d0 = 128) | 20 MB (in byte precision 5 MB) | 5.1 MFlops |

Further, while the system 100 reduces memory and computing costs as demonstrated in TABLE 1, above, the system 100 may also provide high accuracy (i.e., above 94%). TABLE 2 below details the accuracy of system of the present disclosure compared to similar known facial recognition methods. The results are compared to the National Institute of Scientific Standards (NIST) Face Recognition Grand Challenges (FRGC) baseline.

TABLE 2

| Method | Venue (Year) | TRP at FPR = 0.1% |
|---|---|---|
| FRGC (Eigenfaces) | CVPR - 2005 | 15% |
| Gabor + Kernel Fisher | TPAMI - 2006 | 76% |
| Gabor + LTP + KLDA with special de-lighting | TIP - 2010 | 88.5% |
| Multi-scale (LPQ + LBP) + KLDA + multi-kernel fusion | TPAMI - 2012 | 91.5 |
| Present system | | 94.5% |

As discussed above, the system 100 utilizes pair-wise large-scale classification engine 155 in order to determine facial recognition. When training the classification engine 155, the training set may be reformulated as {(x,y)} when adopting a linear SVM to train the classification engine 155 over {(x,y)}. The optimization goal for the linear SVM may be defined, as follows:

$$\min_{W} \frac{w^T w}{2} + C \sum_{i=1}^{l} \max(0, 1 - y_i w^T x_i), \tag{20}$$

where w indicates the weights of the linear SVM, and C is a tunable parameter for regularization.

The objective may be optimized based on many different methods. The recognition decision of the learned classification engine, however, may still be based on the nearest neighbor rule. As a result, for an input face v and a template t, the similarity may be defined, as follows:

$$w^T(v \ominus t). \tag{21}$$

While there may be many available optimization methods for the linear SVM, the required training for those methods would remain very difficult due to the substantial scale. As an example, given N faces in a training set, the number of face pairs may be as many as K=N (N−1)/2. In some known datasets, the number of training samples may be more than 37 million, and the concatenated feature dimension would be approximately 20,000. The resulting whole dataset would be quite large, e.g., several terabytes (TBs), and well beyond the memory capacity of available mobile and handheld devices.

Because the typical dataset size is so large and because accuracy in facial recognition is paramount, techniques such as sampling and filtering would be insufficient to provide a suitable subset for training. Sampling on a typical system (i.e., 16 GB RAM) could process only about 200,000 samples (i.e., about 5%) of a typical whole pair-set, and would fail to identify all the variations in the whole training set. Similarly, known filtering techniques that seek to remove near duplicate samples have been found to remove an inadequate percentage of samples (e.g., less than 20%) to change the scale of the training problem.

As a result, the system 100 utilizes a large-scale classification engine 155 to more effectively generate training pair sets. The classification engine 155 may employ a distributed large-scale training algorithm, e.g., stochastic gradient decent (SGD) and alternative direction method of multipliers (ADMM), designed for use with big data. Converge or convergency may be defined by the number of steps/iterations/epochs needed for the training system to become stable or unchanged. ADMM, for example, sufficiently utilizes each computing node of the system to more quickly converge (i.e., extract) the features of large data sets, and may be used to solve large-scale problems, e.g., min f(w)+g(w). When f(w) and g(w) are of separate objective, and are difficult to optimize together due to function or data complexity, ADMM may introduce a dual variable, e.g., z, and define an equivalent constraint optimization as: min f(w)+g(z), subject to w=z. This optimization allows the ADMM to be solved, e.g., using Lagrangian methods, by solving for w with z fixed, and then solving for z with w fixed, and repeating this dual updating procedure until convergence.

The pair set for the training objective for the optimization goal for the linear SVM, shown in Equation 18 above, can be divided into m blocks {B1, . . . , $B_m$}, and the blocks can be distributed to different cluster nodes. Using ADMM optimization, the training objective can be rewritten, as follows:

$$\min_{w_1,\ldots,w_m,z} \frac{1}{2}z^T z + C\sum_{j=1}^{m}\sum_{i \in B_j} \max(0, 1 - y_i w_j^T x^i) + \frac{\rho}{2}\sum_{j=1}^{m}\|w_j - z\|^2, \tag{22}$$

subject to $w_j - z = 0$, $\forall_j$, where $\rho$ is a pre-defined step for the optimization on dual variable z.

Following the equation listed above, the optimization of $w_1, \ldots, w_m$ may be decomposed into m independent problems.

Figure 3:
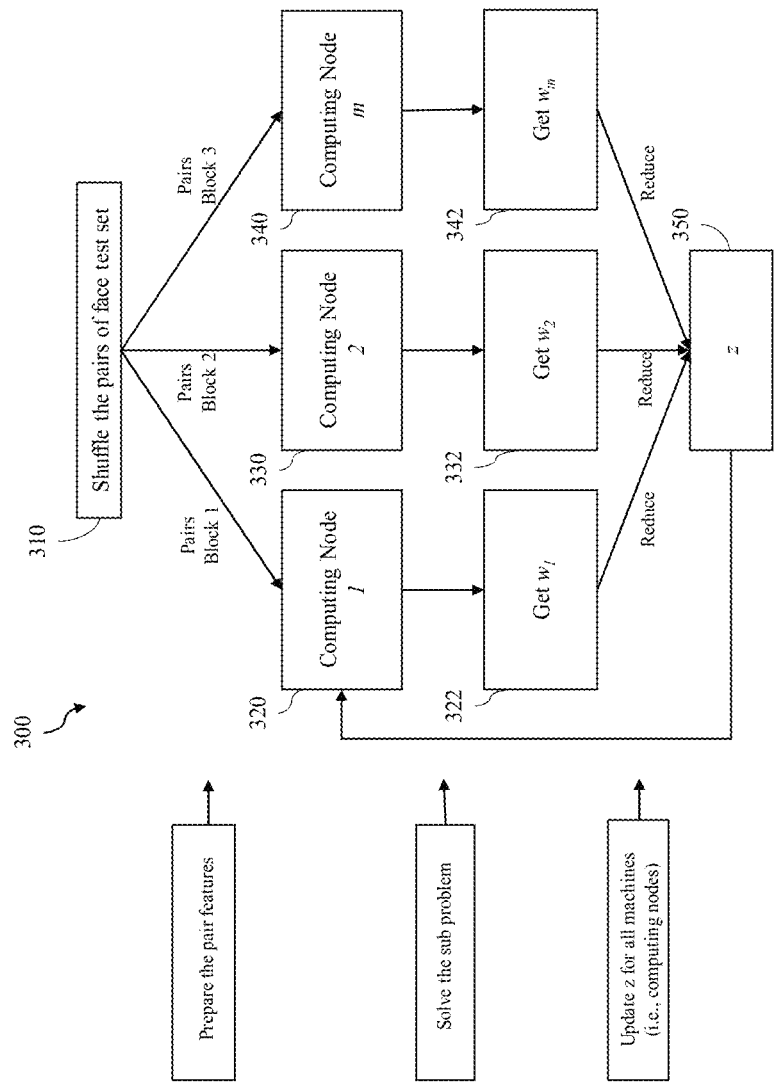
FIG. 3 is an illustration of an example of an iterative large-scale learning process according to an embodiment.

FIG. 3 illustrates an example of an iterative large-scale learning process. The iterative learning process 300 begins at 310 by shuffling pairs of face test sets (in order to prepare the pair features). The pairs may be divided into multiple blocks, e.g., m blocks, and distributed to m computing nodes 320, 330, 340. The computing nodes 320, 330, 340 may each utilize a large-scale training algorithm, e.g., an ADMM algorithm as discussed above, to optimize the dual variables, e.g., w and z (i.e., to solve the sub problem). A set of iterative data loops (i.e., data loop 1, data loop 2, and data loop m) may be formed by computing nodes 320, 330, 340, modules 322, 332, 342, and module 350. For example, a first data loop (data loop 1) may be formed by computing node 1 (320), module 322, and module 350. A second data loop (data loop 2) may be formed by computing node 2 (330), module 332, and module 350. Another data loop (data loop m) may be formed by computing node m (340), module 342, and module 350. The computing nodes 320, 330, 340 may iteratively solve for one variable, e.g., w, by maintaining the second variable, e.g., z, fixed at 350, and outputting the first variable $w_1$, $w_2$, $w_m$ to computing nodes 322, 332, 342, respectively (i.e., to update z for all machines or computing nodes). Once the first variable w has been determined, the first variable w is maintained contained constant at 350 and the process returns to computing nodes 320, 330, 340 in order to determine the second variable z. The dual variable updating procedure of process 300 may be repeated until convergency, i.e., the variables of both pair sets match with acceptable accuracy. Stated differently, the process 300 solves for w with z fixed (at 350), then solving for z with w fixed (at 350), and repeats the process until w and z match.

Figure 4:
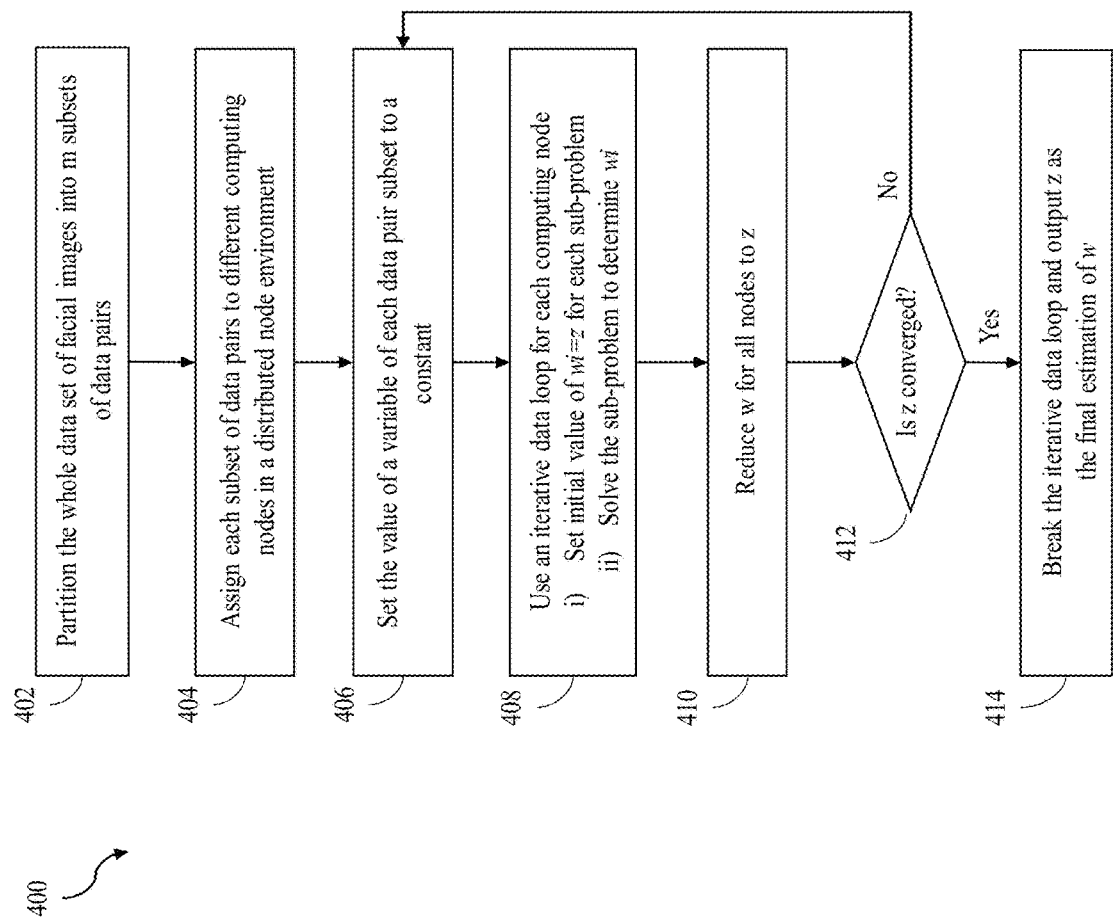
FIG. 4 is an example of an iterative large-scale learning method according to an embodiment.

Turning now to FIG. 4, a method of large-scale training process for image recognition is shown. The method 400 may be implemented as one or more modules in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 402 provides for partitioning a whole data set of facial images. The set of images may be partitioned into multiple subsets, e.g., m subsets, of data pairs. Block 404 provides for assigning each subset of data pairs to different computing nodes, e.g., in a distributed node environment. An example of this type of distributed environment is discussed above with respect to FIG. 3. Block 406 provides for setting the value of a variable, e.g., a first variable z, of each data pair subset to a constant, e.g., 0 or 1. Block 408 provides for using an iterative data loop for each distributed computing node. Moreover, block 408 may include setting the initial value of the pair set, e.g., wi=z, for each sub-problem, where z is constant. Further, block 408 may include solving the sub-problem to determine wi. Block 410 provides for determining whether z is converged. If "No" at 410, the method returns to block 406 and repeats the steps of the process until z is converged. If "Yes" at 410, the method proceeds to block 412 which provides for breaking the iterative data loop and outputting z as the final estimation of w.

Figure 5:
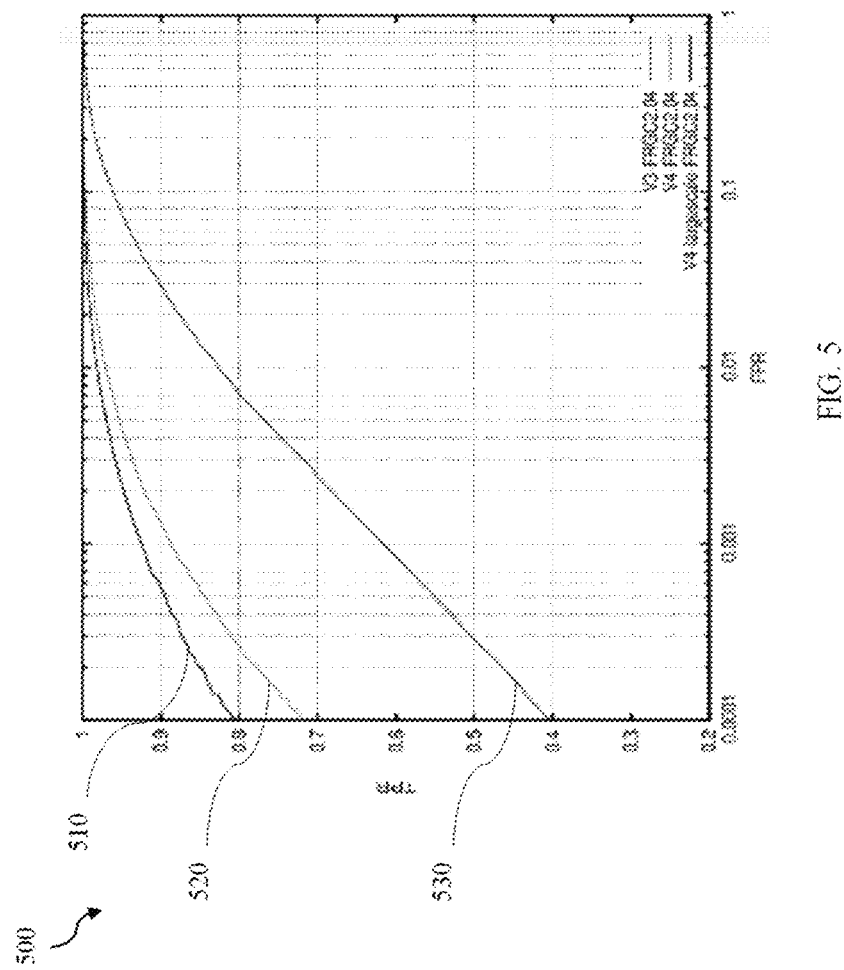
FIG. 5 is a block diagram of an example of a large-scale training process for image recognition according to an embodiment.

FIG. 5 is a chart that shows an example of the accuracy of the large-scale training process on benchmarks of FRGC (face recognition grand challenge), e.g., the iterative learning process 300 discussed above. The chart 500 graphs the benchmark accuracies of a large-scale training process 510, a first small-scale training process 520, and a second small-scale training process 530. The true-positive-rate (TPR) is listed on the vertical (y) axis and equals to #correctly-identified-subject-pairs/#total-positive-match-pairs. The false-positive-rate (FPR) is listed on the horizontal (x) axis and equals to incorrectly-identified-as-positive-pairs#/total-negative-matches. The accuracy using in comparison is true-positive-rate (TPR) at false-positive-rate (FPR) equals 0.1% (i.e., TPR @ FPR=0.1%) using nearest neighbor classification. The chart demonstrates that large-scale training brings obvious accuracy improvement.

Figure 6:
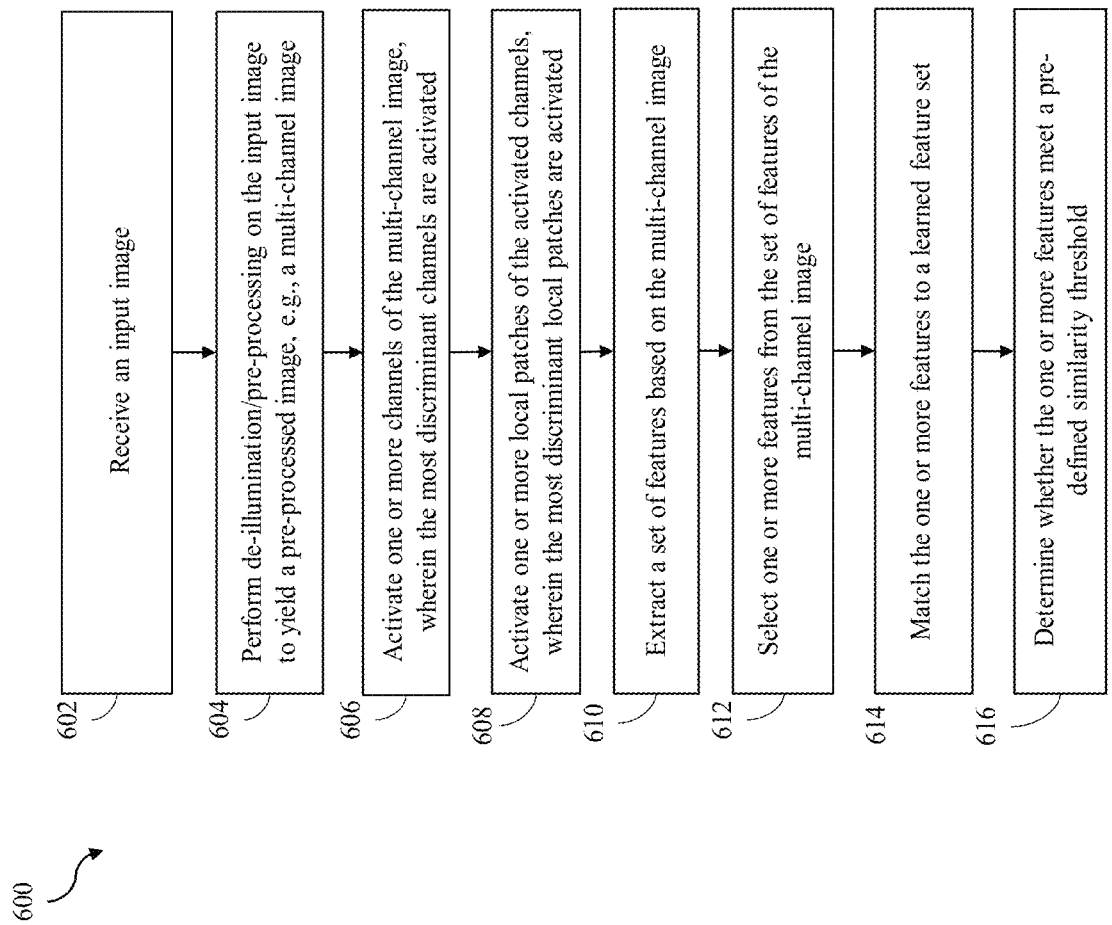
FIG. 6 is an example of a facial recognition process according to an embodiment.

Turning now to FIG. 6, a method of image recognition is shown. The method 600 may be implemented as one or more modules in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 602 provides for receiving an input image. Block 604 provides for performing de-illumination and/or pre-processing on the input image to yield a pre-processed image. The pre-processed image may be represented as a multi-channel image. Block 606 provides for activating one or more channels of the multi-channel image. The channels may be activated in a manner that identifies the most discriminant channels. Block 608 provides for activating one or more local patches of the activated channels. The local patches may be activated in a manner that identifies the most discriminant local patches. Block 610 provides for extracting a set of features based on the multi-channel image. The set of features may be determined by, for example, the most discriminant local patches. Block 612 provides for selecting one or more features from the set of features of the multi-channel image. Block 614 provides for matching the one or more features to a learned feature set, e.g., a feature pair set. Block 616 provides for determining whether the one or more features meet a pre-defined similarity threshold.

Figure 7:
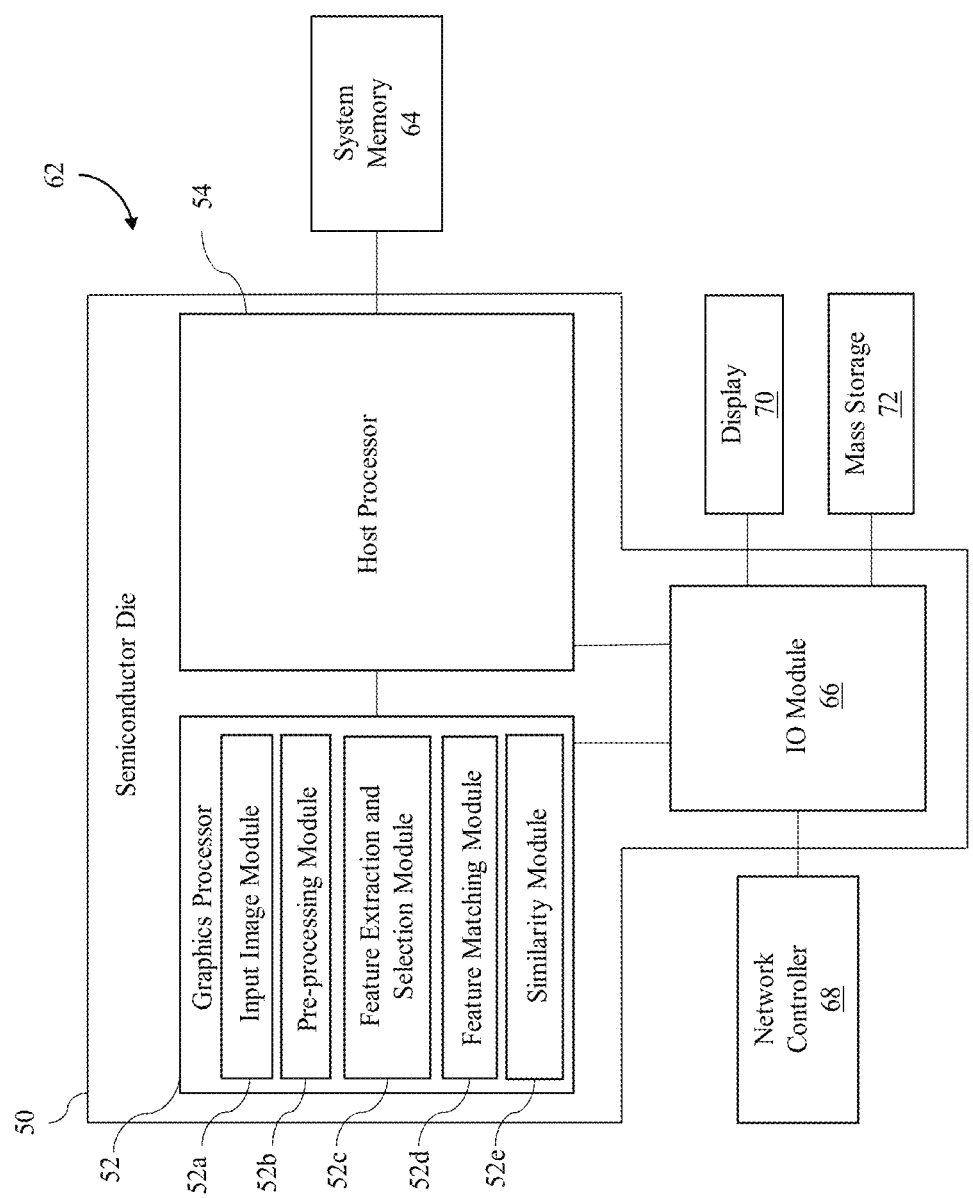
FIG. 7 is a block diagram of an example of a facial recognition system according to an embodiment.

Turning now to FIG. 7, a computing system 62 is shown, wherein the system 62 may be part of a mobile platform such as a laptop, mobile Internet device (MID), personal digital assistant (PDA), media player, imaging device, wearable computer, etc., any smart device such as a smart phone, smart tablet, smart TV (television) and so forth, or any combination thereof. The system 62 may also be part of a fixed platform such as a personal computer (PC), server, workstation, etc. The illustrated system 62 includes one or more memory devices such as, for example, system memory 64 and/or mass storage 72, wherein the memory device may store input images. The system 62 may also include a semiconductor die 50 having a host processor 54 (e.g., central processing unit/CPU) with an integrated memory controller (iMC, not shown) that provides access to the system memory 64, which may include, for example, double data rate (DDR) synchronous dynamic random access memory (SDRAM, e.g., DDR3 SDRAM JEDEC Standard JESD79-3C, April 2008) modules. The modules of the system memory 64 may be incorporated, for example, into a single inline memory module (SIMM), dual inline memory module (DIMM), small outline DIMM (SODIMM), and so on.

The semiconductor die 50 may also include an image or graphics processor 52 (52a-52c) integrated into the semiconductor die 50 (e.g., in a system on chip/SoC configuration) along with the host processor 54 and an input/output (IO) module 66, wherein the illustrated graphics processor 52 generally modifies the input images in order to achieve various special effects. More particularly, the graphics processor 52 may include an input image module 52a to receive input images and an image de-illumination/pre-processor module 52b to process each input image to yield a pre-processed, i.e., multi-channel, image. The de-illumination/pre-processor module 52b may also activate one or more channels of the pre-processed image to yield activated channels. The de-illumination/pre-processor module 52b may further identify and activate one or more feature rich local patches within the activated channels to yield activated local patches for face recognition. The feature extraction and selection module 52c may identify the more discriminant (i.e., most feature rich) local patches as being better suited for facial recognition. The feature extraction and selection module 52c may also utilize the activated local patches pool over certain facial features (e.g., spatial and structural features) to yield a feature descriptor for each local patch. The feature matching module 52d may project the feature descriptor of each local patch to obtain a full representation of the input image. The similarity 52e may compare the local patches and associated learned features (e.g., via a feature vector) to determine whether the pair set meets a determined accuracy requirement. The local patches and corresponding learned features (i.e., feature vectors) may also be stored to a feature database on a system memory device, e.g., system memory 64 and/or mass storage 72.

The host processor 54 may also include one or more processor cores (not shown), where each core may be fully functional with instruction fetch units, instruction decoders, level one (L1) cache, execution units, and so on. The host processor 54 may alternatively communicate with an off-chip variation of the iMC, also known as a Northbridge, via a front side bus or a point-to-point fabric that interconnects each of the components in the system 62. The host processor 54 may also execute an operating system (OS, not shown).

The illustrated host processor 54 communicates with the IO module 66, also known as a Southbridge, via a bus. The iMC/host processor 54 and the IO module 66 are sometimes referred to as a chipset. The host processor 54 may also be operatively connected to a network (not shown) via a network port through the IO module 66 and a network controller 68. Thus, the network controller 68 may provide off-platform communication functionality for a wide variety of purposes such as wired communication or wireless communication including, but not limited to, cellular telephone (e.g., Wideband Code Division Multiple Access, W-CDMA (Universal Mobile Telecommunications System/UMTS), CDMA2000 (IS-856/IS-2000), etc.), Wi-Fi (Wireless Fidelity, e.g., Institute of Electrical and Electronics Engineers/IEEE 802.11, 2007 Edition), Bluetooth (e.g., IEEE 802.15.1-2005, Wireless Personal Area Networks), WiMax (e.g., IEEE 802.16-2004), Global Positioning System (GPS), spread spectrum (e.g., 900 MHz), and other radio frequency (RF) telephony purposes. The IO module 66 may also communicate with a display 70 to provide for the visual output/presentation of video, images, and other content. The network controller 68 may communicate with the IO module 66 to provide support for user interface devices (not shown) such as a keypad, mouse, etc., in order to allow a user to interact with and perceive information from the system 62.

The IO module 66 may also have internal controllers (not shown) such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The illustrated IO module 66 is also coupled to the mass storage 72, which may include a hard drive, read only memory (ROM), optical disk, flash memory, etc.

The graphics processor 52 may alternatively be coupled to a dedicated graphics memory (not shown), wherein the dedicated graphics memory may include, for example, GDDR (graphics DDR) or DDR SDRAM modules, or any other memory technology suitable for supporting graphics rendering. The graphics processor 52 and graphics memory might also be installed on a graphics/video card, wherein the graphics processor 52 may communicate with the host processor 54 via a graphics bus such as a PCI Express Graphics (PEG, e.g., Peripheral Components Interconnect/PCI Express x16 Graphics 150W-ATX Specification 1.0, PCI Special Interest Group) bus, or Accelerated Graphics Port (e.g., AGP V3.0 Interface Specification, September 2002) bus. The graphics card and/or graphics processor 52 may be integrated onto a system motherboard, configured as a discrete card on the motherboard, etc.

Figure 8:
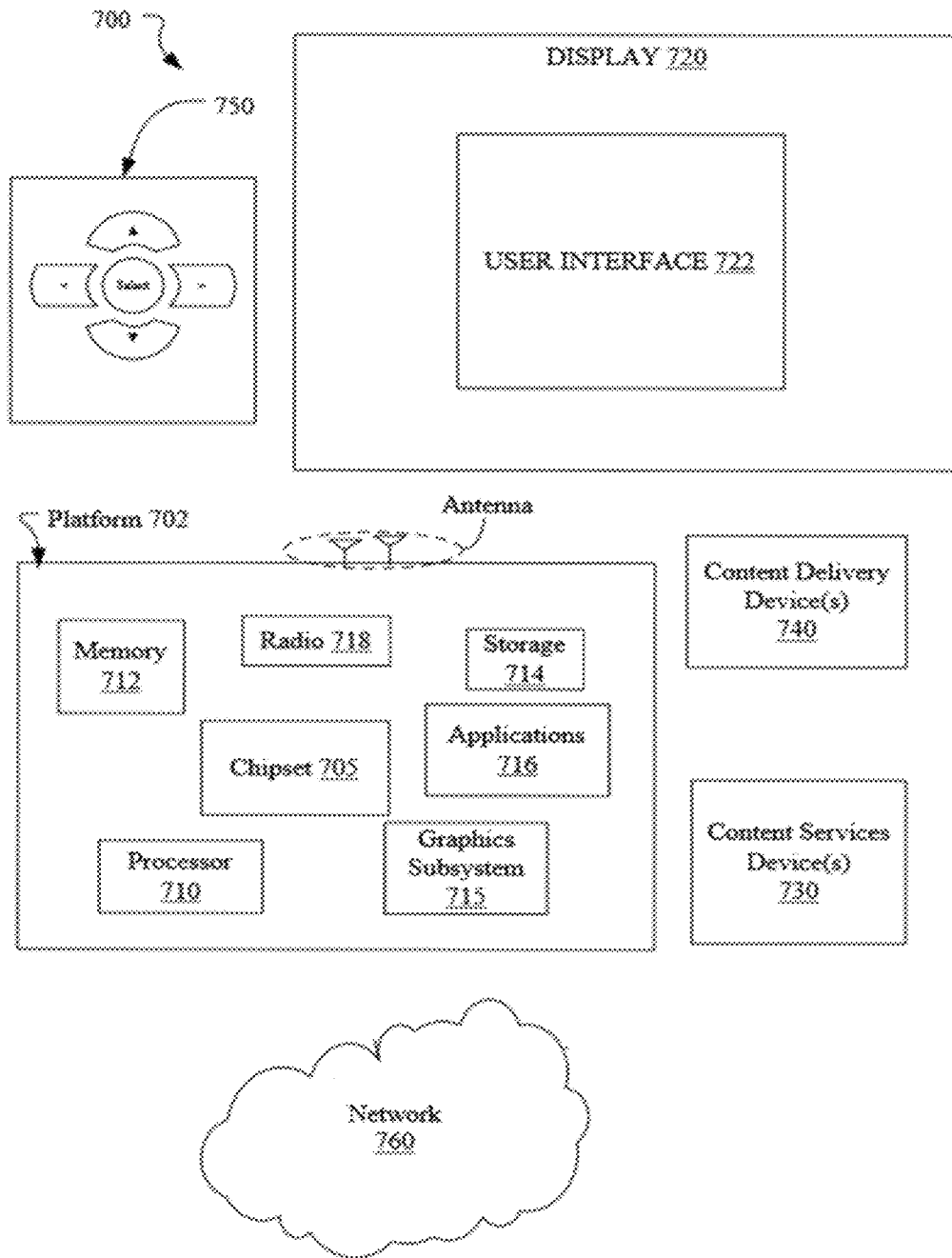
FIG. 8 is a block diagram of an example of a system having a navigation controller according to an embodiment.

FIG. 8 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. Thus, the system 700 may be used to conduct view interpolation as described herein.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface, DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of uni-directionally or bi-directionally communicating content between content providers and platform 702 and/display 720, via network 760 or directly. It will be appreciated that the content may be communicated uni-directionally and/or bi-directionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
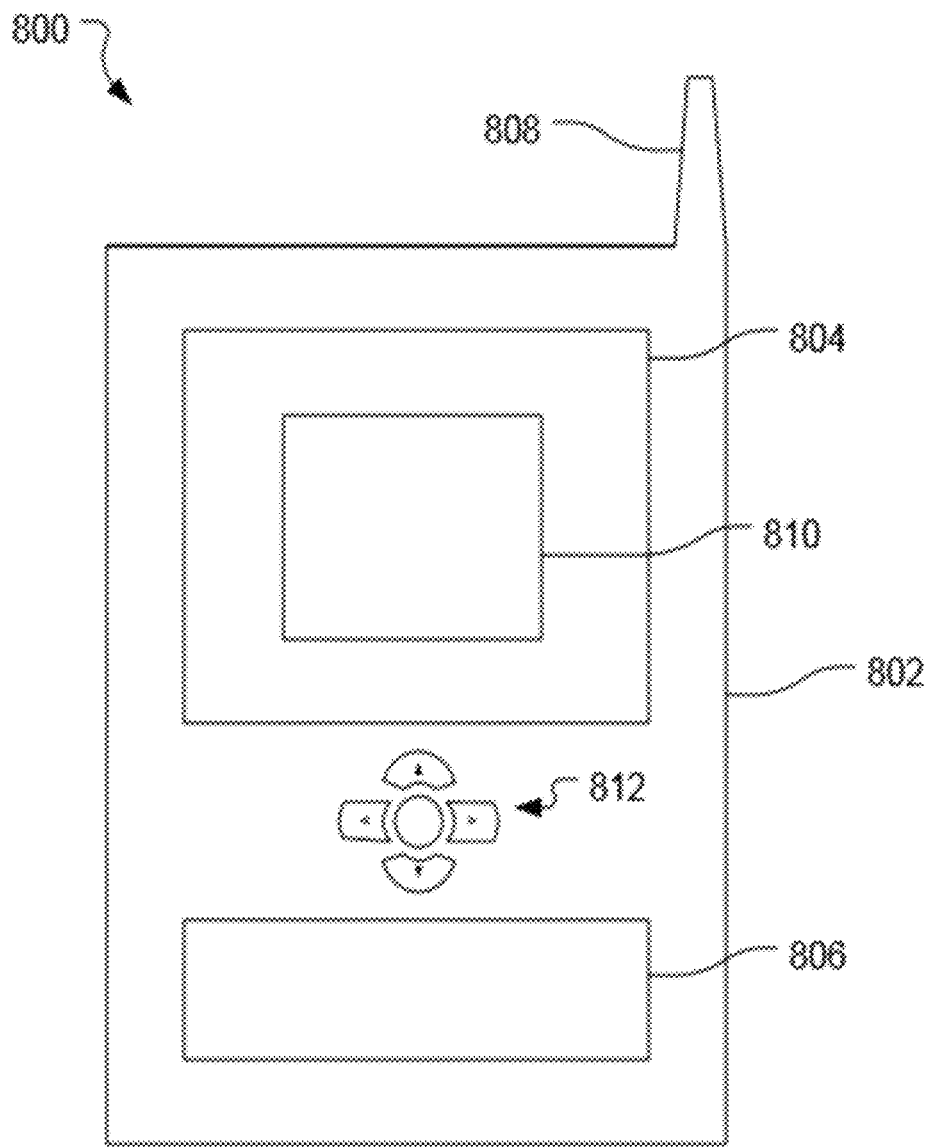
FIG. 9 is a block diagram of an example of a system having a small form factor according to an embodiment.

As described above, the system 700 may be embodied in varying physical styles or form factors. FIG. 9 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

ADDITIONAL NOTES AND EXAMPLES

Example 1 may include a facial recognition system including a memory device to store an input image, a processor including an image input interface to receive the input image, a pre-processor to model the input image to yield a multi-channel image, a feature extractor to extract a set of features based on the multi-channel image, a feature selector to select one or more features from the set of features of the multi-channel image, wherein the one or more features are selected based on an ability to differentiate features, a feature matcher to match the one or more features to a learned feature set, and a similarity detector to determine whether the one or more features meet a pre-defined similarity threshold.

Example 2 may include the system of Example 1, wherein the pre-processor further is to activate one or more channels of the multi-channel image to yield one or more activated channels.

Example 3 may include the system of Example 2, wherein the one or more activated channels are to be determined based on their ability to differentiate features.

Example 4 may include the system of Example 2, wherein the pre-processor further is to activate one or more local patches of the one or more activated channels.

Example 5 may include the system of Example 4, wherein the one or more local patches are to be determined based on their ability to differentiate features.

Example 6 may include the system of any one of Examples 1 to 5, wherein the feature matcher is to utilize a large-scale data learning process to perform the feature matching.

Example 7 may include a facial image recognition apparatus including an image input interface to receive an input image, a pre-processor to model the input image to yield a multi-channel image, a feature extractor to extract a set of features based on the multi-channel image, a feature selector to select one or more features from the set of features of the multi-channel image, wherein the one or more features are selected based on an ability to differentiate features, a feature matcher to match the one or more features to a learned feature set, and a similarity detector to determine whether the one or more features meet a pre-defined similarity threshold.

Example 8 may include the apparatus of Example 7, wherein the pre-processor further is to activate one or more channels of the multi-channel image to yield one or more activated channels.

Example 9 may include the apparatus of Example 8, wherein the one or more activated channels are to be determined based on their ability to differentiate features.

Example 10 may include the apparatus of Example 8, wherein the pre-processor further is to activate one or more local patches of the one or more activated channels.

Example 11 may include the apparatus of Example 10, wherein the one or more local patches are to be determined based on their ability to differentiate features.

Example 12 may include the apparatus of any one of Examples 7 to 11, wherein the feature matcher further is to utilize a large-scale data learning process to perform the feature matching.

Example 13 may include a method of recognizing facial images, including modeling an input image to yield a multi-channel image, extracting a set of features based on the multi-channel image, selecting one or more features from the set of features of the multi-channel image, wherein the one or more features are selected based on an ability to differentiate features, matching the one or more features to a learned feature set, and determining whether the one or more features meet a pre-defined similarity threshold.

Example 14 may include the method of Example 13, wherein modeling the input image further is to include activating one or more channels of the multi-channel image to yield one or more activated channels.

Example 15 may include the method of Example 14, wherein the one or more activated channels are to be determined based on their ability to differentiate features.

Example 16 may include the method of Example 14, wherein extracting features of the input image further is to include activating one or more local patches of the one or more activated channels.

Example 17 may include the method of Example 16, wherein the one or more local patches are to be determined based on their ability to differentiate features.

Example 18 may include the method of any one of Examples 13 to 17, wherein the feature matcher is to utilize a large-scale data learning process to perform the feature matching.

Example 19 may include at least one computer readable storage medium comprising a set of instructions which, when executed by a computing device, cause the computing device to model an input image to yield a multi-channel image, extract a set of features based on the multi-channel image, select one or more features from the set of features of the multi-channel image, wherein the features are selected based on an ability to differentiate features, match the one or more features to a learned feature set, and determine whether the one or more features meet a pre-defined similarity threshold.

Example 20 may include the at least one computer readable storage medium of Example 19, wherein the instructions, when executed, cause a computing device to activate one or more channels of the multi-channel image to yield one or more activated channels.

Example 21 may include the at least one computer readable storage medium of Example 20, wherein the instructions, when executed, cause a computing device to determine the one or more activated channels based on their ability to differentiate features.

Example 22 may include the at least one computer readable storage medium of Example 20, wherein extracting features of the input image is to further include activating one or more local patches of the one or more activated channels.

Example 23 may include the at least one computer readable storage medium of Example 22, wherein the one or more local patches are to be determined based on their ability to differentiate features.

Example 24 may include the at least one computer readable storage medium of any one of Examples 19 to 23, wherein the feature matcher further is to utilize a large-scale data learning process to perform the feature matching.

Example 25 may include an image recognition apparatus comprising means for modeling an input image to yield a multi-channel image, means for extracting a set of features based on the multi-channel image, means for selecting one or more features from the set of features of the multi-channel image, wherein the one or more features are selected based on an ability to differentiate features, means for matching the one or more features to a learned feature set, and means for determining whether the one or more features meet a pre-defined similarity threshold.

Example 26 may include the apparatus of Example 25, wherein the means modeling the input image further includes means for activating one or more channels of the multi-channel image to yield one or more activated channels.

Example 27 may include the apparatus of Example 26, wherein the one or more activated channels are to be determined based on their ability to differentiate features.

Example 28 may include the apparatus of Example 26, wherein the means for extracting features of the input image further includes means for activating one or more local patches of the one or more activated channels.

Example 29 may include the apparatus of Example 28, wherein the one or more local patches are to be determined based on their ability to differentiate features.

Example 30 may include the apparatus of any one of Examples 25 to 29, wherein the means for matching features utilizes a large-scale data learning process to perform the feature matching.

Techniques disclosed herein may provide a methodology of quickly and efficiently determining matches in images of faces, while also providing an implementation that may be executed on relatively small, mobile devices having limited system resources. Techniques may apply to a wide range of applications that may benefit from the security and convenience afforded by facial recognition. The techniques may be tuned to current and the next generation processor instruction set architectures, resulting in the ability to utilize large data sets (e.g., big data) and potentially providing the fastest image recognition functionality available.

In addition, techniques may provide a quality security application that is suitable for use within various applications including high, medium, and low level security, and in various industries including computing, credential validation, controlled access, custody, high volume image searching, security, and others.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

We claim:

1. A system comprising:
   a memory device to store an input image;
   a processor including,
   an image input interface to receive the input image,
   a pre-processor to model the input image to yield a multi-channel image,
   a feature extractor to extract a set of features based on the multi-channel image,
   a feature selector to select one or more features from the set of features of the multi-channel image, wherein the one or more features are selected based on an ability to differentiate features,
   a feature matcher to match the one or more features to a learned feature set, and
   a similarity detector to determine whether the one or more features meet a pre-defined similarity threshold.

2. The system of claim 1, wherein the pre-processor further is to activate one or more channels of the multi-channel image to yield one or more activated channels.

3. The system of claim 2, wherein the one or more activated channels are to be determined based on their ability to differentiate features.

4. The system of claim 2, wherein the pre-processor further is to activate one or more local patches of the one or more activated channels.

5. The system of claim 4, wherein the one or more local patches are to be determined based on their ability to differentiate features.

6. The system of claim 1, wherein the feature matcher further is to utilize a large-scale data learning process to perform the feature matching.

7. An apparatus comprising:
   an image input interface to receive an input image;
   a pre-processor to model the input image to yield a multi-channel image;
   a feature extractor to extract a set of features based on the multi-channel image;
   a feature selector to select one or more features from the set of features of the multi-channel image, wherein the one or more features are selected based on an ability to differentiate features;
   a feature matcher to match the one or more features to a learned feature set; and
   a similarity detector to determine whether the one or more features meet a pre-defined similarity threshold.

8. The apparatus of claim 7, wherein the pre-processor further is to activate one or more channels of the multi-channel image to yield one or more activated channels.

9. The apparatus of claim 8, wherein the one or more activated channels are to be determined based on their ability to differentiate features.

10. The apparatus of claim 8, wherein the pre-processor further is to activate one or more local patches of the one or more activated channels.

11. The apparatus of claim 10, wherein the one or more local patches are to be determined based on their ability to differentiate features.

12. The apparatus of claim 7, wherein the feature matcher further is to utilize a large-scale data learning process to perform the feature matching.

13. A method comprising:
   modeling an input image to yield a multi-channel image;
   extracting a set of features based on the multi-channel image;
   selecting one or more features from the set of features of the multi-channel image,
   wherein the one or more features are selected based on an ability to differentiate features;
   matching the one or more features to a learned feature set; and determining whether the one or more features meet a pre-defined similarity threshold.

14. The method of claim 13, wherein modeling the input image further is to include activating one or more channels of the multi-channel image to yield one or more activated channels.

15. The method of claim 14, wherein the one or more activated channels are to be determined based on their ability to differentiate features.

16. The method of claim 13, wherein extracting features of the input image further is to include activating one or more local patches of the one or more activated channels.

17. The method of claim 16, wherein the one or more local patches are to be determined based on their ability to differentiate features.

18. The method of claim 13, wherein the feature matcher utilizes a large-scale data learning process to perform the feature matching.

19. At least one non-transitory computer readable storage medium comprising a set of instructions which, when executed by a computing device, cause the computing device to:
   model an input image to yield a multi-channel image,
   extract a set of features based on the multi-channel image,
   select one or more features from the set of features of the multi-channel image, wherein the features are selected based on an ability to differentiate features,
   match the one or more features to a learned feature set, and
   determine whether the one or more features meet a pre-defined similarity threshold.

20. The at least one non-transitory computer readable storage medium of claim 19, wherein the instructions, when executed, cause a computing device to activate one or more channels of the multi-channel image to yield one or more activated channels.

21. The at least one non-transitory computer readable storage medium of claim 20, wherein the instructions, when executed, cause a computing device to determine the one or more activated channels based on their ability to differentiate features.

22. The at least one non-transitory computer readable storage medium of claim 20, wherein extracting features of the input image is to further include activating one or more local patches of the one or more activated channels.

23. The at least one non-transitory computer readable storage medium of claim 22, wherein the one or more local patches are to be determined based on their ability to differentiate features.

24. The at least one non-transitory computer readable storage medium of claim 19, wherein the feature matcher further is to utilize a large-scale data learning process to perform the feature matching.

25. An apparatus comprising:
   means for modeling an input image to yield a multi-channel image,
   means for extracting a set of features based on the multi-channel image,
   means for selecting one or more features from the set of features of the multi-channel image, wherein the one or more features are selected based on an ability to differentiate features,
   means for matching the one or more features to a learned feature set, and
   means for determining whether the one or more features meet a pre-defined similarity threshold.

* * * * *